June 6, 1944.  F. P. AYERS  2,350,862
LINEAR-DIMENSION GAUGE
Filed Sept. 30, 1943  2 Sheets-Sheet 2

INVENTOR
FREDERICK P. AYERS

Patented June 6, 1944

2,350,862

UNITED STATES PATENT OFFICE 2,350,862

LINEAR-DIMENSION GAUGE

Frederick Percival Ayers, Barnstaple, North Devon, England

Application September 30, 1943, Serial No. 504,482
In Great Britain December 8, 1941

5 Claims. (Cl. 33—147)

This invention relates to a gauge for testing linear dimensions and has for its object to provide an improved gauge of the kind which during the testing of workpieces is adapted automatically to effect visual or audible indication should the workpiece not be finished within certain limits of error. Such a gauge is particularly useful in workshops employing semi-skilled labour where there are employed work-people not conversant with the reading of dials or calibrated instruments and gauges.

According to the present invention a gauge for testing linear dimensions comprises a displaceable feeler member for contacting the workpiece and capable of movement to vary the distance between its work-contacting end and a work-supporting surface, said feeler member having associated therewith an electrical contactor capable of movement with the feeler and disposed between a pair of adjustable contacts connected with visual or audible means for electrically indicating respectively high and low limits of movement of the feeler member, and is characterised in that the feeler member is a rod slidable in a sleeve, the latter carrying the electrical contactor and being capable of movement with the feeler rod until the contactor engages one of said contacts for indicating a high limit, the feeler member then being capable of continued movement relatively to the sleeve.

By means of the present invention should an operator attempt to force a very high work-piece under the feeler rod the rod can continue to move even though the sleeve is held stationary by the contactor engaging one of the adjustable contacts.

In order that the invention may be clearly understood and readily carried into effect, reference will now be made to the accompanying sheets of drawings which illustrate two embodiments of the invention by way of example. In the drawings.

Figure 1:
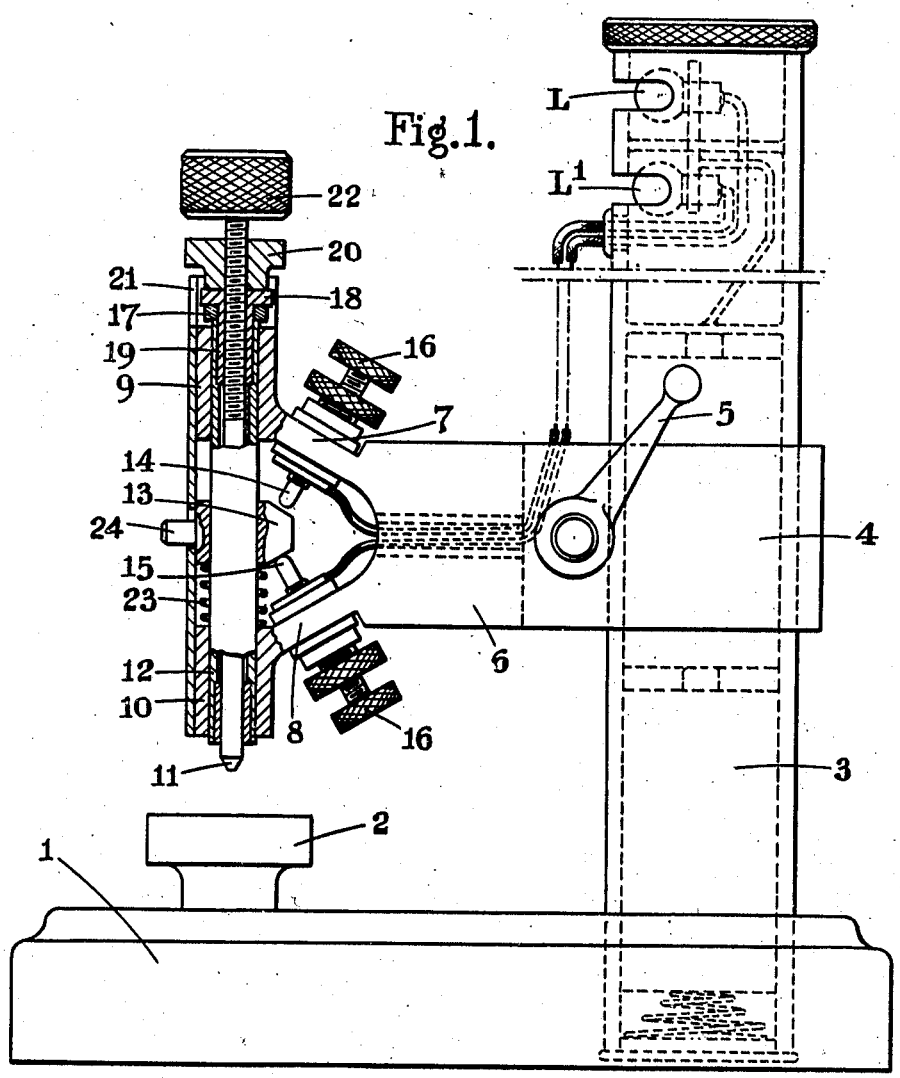
Figure 1 is a part sectional side view of the gauge complete with stand.

Referring to the drawings the gauge is carried by a stand comprising a base 1 having a work support 2. The base 1 also has connected thereto the lower end of a pillar 3 upon which is slidable a split collar 4 adapted to be tightened on the pillar 3 by a locking handle 5 in any desired position.

The collar 4 has extending horizontally therefrom a supporting arm 6 from which extend two angularly directed limbs 7 and 8 which terminate in hollow bosses 9 and 10 located coaxially in spaced relationship one above the other, these bosses supporting the feeler mechanism of the gauge.

The feeler mechanism comprises a vertical feeler rod 11 slidable in a sleeve 12. Fitted to this sleeve 12 midway between the limbs 7 and 8 of the arm 6 is an electrical contactor 13 which is normally located between two adjustable contacts or points 14 and 15 which may comprise two contact screws which pass respectively through insulation in the two limbs 7 and 8 into the space between them, these screws having heads 16 outside the limbs by means of which they can be screwed towards or away from the contactor 13 on the sleeve 12. The two contacts 14 and 15 are electrically connected to two differently coloured lamps L and L' which may be red and green one of which is lighted according to which adjustable contact is engaged by the contactor 13. In place of the contact screws any other suitable contact carriers may be used whereby their spacing may be set at will. Further, when the contacts are part of screws, the screws may be headless and adjusted by nuts which abut against the inner faces of the limbs of the supporting member.

The sleeve 12 engages at it supper end against the lower face of a loose bearing ring 17 above which is located an adjusting nut 18 having a tubular depending extension 19 which enters the upper end of the sleeve 12. The adjusting nut 18 has associated therewith a locknut 20 which serves to lock the nut 18 in its adjusted position on the threaded upper extremity of the feeler rod 11. The purpose of the bearing ring 17 is to present an ample bearing surface against which the upper end of the sleeve 12 can engage. The adjusting nut 18 is preferably formed with flats or made square and engages in a slot 21 on the boss 9 so that the nut and the whole feeler mechanism cannot turn.

A weight 22 is fitted at the upper end of the feeler rod 11 and is such that it will overcome the effect of a compression spring 23 positioned between the hollow boss 10 and the contactor 13. The assembly of sleeve 12 and feeler rod 11 will normally rest in its lowermost position with the contacter 13 resting on the bottom contact point 15.

The operation of the gauge is as follows: Firstly, the split collar 4 is adjusted vertically on the pillar 3 to effect a rough setting. A standard testing block is first placed between the feeler rod 11 and the work-supporting surface 2. The feeler rod 11 is then set by manipulation of its adjusting nut 18 and locknut 20. The two contact screws 14 and 15 or equivalents are then set relatively to the contact 13 on the feeler rod so that they are spaced away from the feeler contact 13 a distance according to the permitted limits of error. Normally the feeler contactor 13 will rest upon the lower contact point 15 when the gauge is not in use. When a workpiece is placed in position the feeler rod 11 may be raised clear of the workpiece by lifting the weight 22 by hand. Alternatively the weight can be lifted to raise the feeler arm 11 by an electromagnet brought into operation by means of a switch.

Assuming that a "high" workpiece is being tested the weighted feeler rod 11 will rise and the adjusting nut 19 will move upwards with the feeler rod away from the bearing ring 17 and the spring 23 will then urge the sleeve 12 upwards so that the latter acts as a follower and will move the contactor 13 into engagement with the upper contact point 14 to light the lamp L' to indicate a high reading. Supposing however a workpiece is very high and a workman attempts to force it under the feeler arm 11 no damage will be inflicted upon the gauge because the sleeve 12 after it has been moved upwards by said spring 23 will remain stationary after the feeler contact 13 engages the upper contact point 14 and the feeler rod 11 itself will move idly relatively to the sleeve 12.

Should however no upward movement be imparted to the feeler rod 11 the contactor 13 will remain in engagement with the lower contact point 15 and the lamp L controlled by that contact will remain alight and so indicate that the workpiece is below the lower limit of error. When not in use the feeler contactor 13 will normally engage the lower contact point and so close the circuit to the lamp L of that contact. To avoid waste of electric current when the gauge is not in use a switch may be provided which is moved to the "on" position only when the gauge is to be used. It is desirable, but not essential, to keep the feeler contactor 13 located centrally between the limbs 7 and 8 of the arm member 6 and to enable this to be done the feeler contactor 13 may be fitted with an extension 24 adapted to register with a datum line marked on a card or other surface located in juxtaposition to said extension.

Figure 2:
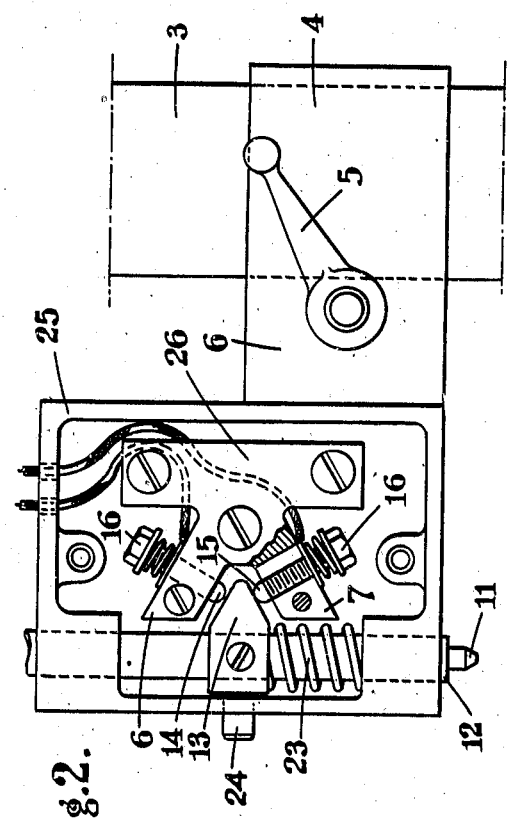
Figure 2 illustrates a slight modification.

Referring to Figure 2 the mechanism hereinbefore described may if desired be housed in a neat casing 25 which to facilitate setting of the gauge may be provided with a door to enable the contact screws or equivalents to be set. In the drawings the door is removed to show the interior of the casing 25. In this embodiment the casing 25 may be carried by the supporting arm 6 and the limbs 7 and 8 for the adjustable contacts form part of a contact block 26 supported in the casing. The door or covering could be closed and sealed.

When electric lamps are used in connection with this invention to give a visual indication as described herein, it is to be understood that they may be of different or the same colour, and, if desired, may be suitably marked with plus and minus signs or other suitable legends. In addition, a third lamp not shown may be included indicating correct size in any suitable way and so wired up that it is constantly alight. In this case, with the third lamp alone illuminated it will indicate to the operator that the work is within the required limits, but this lamp illuminated in conjunction with either of the "error" lamps will at once indicate that the work is outside the prescribed limits.

With a workpiece having a number of parts to be measured a corresponding number of gauges may be provided close together so that a workman can after testing one part test another part in an adjacent gauge.

I claim:

1. A gauge comprising a work support, a work-engageable feeler member and an electrical contactor member both mounted for movement toward and away from said work support, yieldable means tending constantly to move said contactor member away from said work support and effective to do so when said contactor member is unrestrained against such movement, means tending constantly to move said feeler member toward said work support under a force in excess of the force exerted by said yieldable means, an operative connection between said feeler member and said contactor member whereby the former moves the latter toward said work support when a piece of work interposed between said work support and said feeler member is of lesser than a predetermined dimension and whereby said contactor member is released for movement away from said work support by said yieldable means when said feeler member is moved away from said work support by interposition between the latter and said work support of a piece of work of greater than said predetermined dimension, a pair of spaced apart contacts one to be engaged by said contactor member upon movement of the latter toward the work support by said feeler member when a piece of work interposed between the work support and said feeler member is of lesser than said predetermined dimension and the other to be engaged by said contactor member upon movement of the latter away from the work support when a piece of work interposed between the work support and said feeler member is of greater than said predetermined dimension, separate electrical circuits controlled by engagement and disengagement of said contactor member with and from said contacts, and electrical indicators in said circuits.

2. A gauge as set forth in claim 1 in which the feeler member is adjustable relative to its operative connection with the contactor member to adapt the gauge for use in gauging pieces of work of various different dimensions.

3. A gauge as set forth in claim 1 in which the contactor member includes a sleeve and in which the feeler member is in the form of a rod extending through said sleeve.

4. A gauge as set forth in claim 1 in which the contactor member includes a sleeve, in which the feeler member is in the form of a rod extending through said sleeve, and in which the operative connection between said contactor member and said feeler member comprises an abutment on said rod engageable with the end of said sleeve remote from the work support whereby the sleeve and the contactor member are movable toward the work support by the feeler member and whereby the latter is freely movable away from the work support independently of said sleeve and said contactor member.

5. A gauge as set forth in claim 1 in which the contactor member includes a sleeve, in which the feeler member is in the form of a rod extending through said sleeve, and in which the operative connection between said contactor member and said feeler member comprises an abutment on said rod engageable with the end of said sleeve remote from the work support whereby the sleeve and the contactor member are movable toward the work support by the feeler member and whereby the latter is freely movable away from the work support independently of said sleeve and said contactor member, said abutment being threaded on said rod for adjustment longitudinally with respect thereto to adapt the gauge for use in gauging pieces of work of various different dimensions.

FREDERICK PERCIVAL AYERS.